United States Patent
Sohn et al.

(10) Patent No.: US 12,516,555 B2
(45) Date of Patent: Jan. 6, 2026

(54) METHOD OF CONTROLLING ELECTRIC LATCH FOR DOOR OF VEHICLE

(71) Applicants: Hyundai Motor Company, Seoul (KR); Kia Corporation, Seoul (KR)

(72) Inventors: Chang-Woo Sohn, Seoul (KR); Byeong-Kwan Kim, Gyeonggi-do (KR); Hee-Tae Yang, Gyeonggi-do (KR); Jae-Min Ryu, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 232 days.

(21) Appl. No.: 17/982,231

(22) Filed: Nov. 7, 2022

(65) Prior Publication Data

US 2023/0272645 A1 Aug. 31, 2023

(30) Foreign Application Priority Data

Jan. 21, 2022 (KR) ........................ 10-2022-0009454

(51) Int. Cl.
| | | |
|---|---|---|
| *E05B 81/56* | (2014.01) | |
| *E05B 77/02* | (2014.01) | |
| *E05B 77/54* | (2014.01) | |
| *E05B 81/04* | (2014.01) | |
| *E05B 81/90* | (2014.01) | |
| *E05F 15/40* | (2015.01) | |
| *E05F 15/60* | (2015.01) | |
| *E05F 15/72* | (2015.01) | |

(52) U.S. Cl.
CPC .............. *E05B 81/56* (2013.01); *E05B 77/02* (2013.01); *E05B 77/54* (2013.01); *E05B 81/04* (2013.01); *E05B 81/90* (2013.01); *E05F 15/40* (2015.01); *E05F 15/60* (2015.01); *E05F 15/72* (2015.01); *E05Y 2400/52* (2013.01); *E05Y 2900/531* (2013.01)

(58) Field of Classification Search
CPC .......... E05B 77/54; E05B 77/12; E05B 81/20; E05B 81/14; E05B 81/76
See application file for complete search history.

(56) References Cited

U.S. PATENT DOCUMENTS

| | | | | |
|---|---|---|---|---|
| 2008/0105011 A1* | 5/2008 | Machida | ................. | E05B 81/20 292/201 |
| 2011/0016794 A1* | 1/2011 | Nishikibe | ............... | E05B 81/20 49/359 |
| 2014/0110952 A1* | 4/2014 | Lange | ..................... | E05B 81/14 701/45 |
| 2015/0233145 A1* | 8/2015 | Kuriyama | ............... | E05B 81/04 292/201 |

(Continued)

FOREIGN PATENT DOCUMENTS

KR    10-2000-0021649 A    4/2000

*Primary Examiner* — Mirza F Alam
(74) *Attorney, Agent, or Firm* — Fox Rothschild LLP (57) ABSTRACT

The present disclosure provides a method of controlling an electric latch, installed on a door of a vehicle, to lock or unlock the door by being operated by a motor, the method comprising operating an inner button configured to enable a passenger to get off the vehicle; determining whether there is an error in a state where the vehicle has been started; determining whether a vehicle speed of the vehicle is input to a control unit; and, when the vehicle speed is not input, inducing an emergency lever to guide a use of the emergency lever.

15 Claims, 8 Drawing Sheets

(56) References Cited

U.S. PATENT DOCUMENTS

2017/0081897 A1\* 3/2017 Kaino ................... E05F 15/41
2019/0039571 A1\* 2/2019 Shimizu ................ E05B 81/64
2020/0392771 A1\* 12/2020 Toyama ............... E05B 85/103

\* cited by examiner

METHOD OF CONTROLLING ELECTRIC LATCH FOR DOOR OF VEHICLE

CROSS-REFERENCE TO RELATED APPLICATION

This application claims, under 35 U.S.C. § 119 (a), priority to Korean Patent Application No. 10-2022-0009454, filed on Jan. 21, 2022, the disclosure of which is incorporated herein by reference in its entirety.

BACKGROUND

Technical Field

Embodiments of the present disclosure relates to a method of controlling an electric latch applied to a door of a vehicle to lock or unlock the door by driving a motor, and to a method of controlling an electric latch of a door of a vehicle, which may unlock a door by an operation even when there occurs an error in an internal communication of the vehicle.

Description of Related Art

A latch is installed in a door, a trunk, etc. of a vehicle in order to prevent intrusion of an outsider and prevent an opening and closing part of the vehicle from being opened while traveling.

For example, a door latch installed on a door of a vehicle may be configured to perform lock, unlock, open, and close functions, so that the door may not be opened in a locked state, and the door may be opened as the door latch is released from a striker installed on a vehicle body by operating inner handle or outside handle of the door after allowing the door to be in the unlocked state. In addition, when the door is closed, the door latch may restrain the striker to close the door, and then the door latch may become in the locked state.

Meanwhile, recently, electric door latches, in which the lock, unlock, open, and close functions of the door latch are performed by driving a motor other than a passenger's operation, are mainly applied to high-end vehicles.

When the passenger operates a button, the electric door latch performs the lock or unlock function by driving the motor and opens or closes the door in the unlocked state.

As the lock, unlock, open, or close functions of the electric door latch are executed by a simple button operation, the convenience in performing the operation is improved.

However, electric door latches operate as in the following cases when the passenger presses the button to open the door in a situation where a state such as whether the vehicle is started or a vehicle speed is not determined. The electric door latch may be applied to open the door according to the intention of the passenger (Case 1) or not to perform the open operation of the door (Case 2) in consideration of stability. Case 1 has a problem in that the door may be opened while the vehicle travels. Case 2 has a problem in that it is impossible to open the door when a vehicle communication is not available (e.g., CAN communication is OFF due to collision accidents of the vehicle) or when the vehicle is stopped.

The contents described in Detailed Description are to help the understanding of the background of the present disclosure, and may include what is not previously known to those skilled in the art to which the present disclosure pertains.

SUMMARY

The present disclosure has been presented to solve the above problems, and an object of the present disclosure is to provide a method of controlling an electric latch for a door of a vehicle, which controls an electric latch to be unlocked, so that a passenger may operate an emergency lever to open the door in a situation where communication for an in-vehicle control is not available or a vehicle has collided in the vehicle in which the electric latch is applied to the door.

In order to achieve the object, the present disclosure provides a method of controlling an electric latch installed on a door of a vehicle to lock or unlock the door by being operated by a motor, the method comprising operating an inner button configured to enable a passenger to get off the vehicle; determining whether there is an error in a state where the vehicle has been started; determining whether a vehicle speed of the vehicle is input to a control unit; and, when the vehicle speed is not input, inducing an emergency lever to guide a use of the emergency lever.

The inducing of the emergency lever may further comprise controlling, using the control unit, a phrase guiding the use of the emergency lever to be output on a cluster.

The method may further comprise, when the vehicle speed is input to the control unit, determining whether the vehicle is in a stopped state, when it is determined that the vehicle is in the stopped state, opening a door, causing a door unlock signal to be output to a motor by the control unit; and, when the door is opened, releasing a striker installed on a vehicle body of the vehicle, by an electric latch, so that the door is in an operable state by the control unit.

The method may further comprise, when it is determined that the vehicle is not in the stopped state, maintaining, by the electric latch, a state of the striker in which the striker is restrained.

The method may further comprise, when it is determined that there is no error in the state where the vehicle has been started, determining whether the vehicle has been turned off, when it is determined that the vehicle has been turned off, opening a door, causing a door unlock signal to be output to a motor by the control unit, and, when the door is opened, releasing a striker installed on a vehicle body of the vehicle, by an electric latch, so that the door is in an operable state by the control unit.

The method may further comprise, when it is determined that the vehicle has not been turned off, determining whether the vehicle has been stopped, and, when it is determined that the vehicle has been stopped, opening the door.

The method may further comprise, when it is determined that the vehicle has not been stopped, maintaining, by the electric latch, a state of the striker in which the striker is restrained.

Meanwhile, the present disclosure may provide a method of controlling an electric latch installed on a door of a vehicle to lock or unlock the door by being operated by a motor, the method comprising operating an outside handle, installed on a door of the vehicle, enabling entry into the vehicle; determining whether there is an error in a state where the vehicle has been started; determining whether a vehicle speed of the vehicle is input to a control unit; and, when the vehicle speed is not input, activating, by the control unit, an emergency lever.

The activating of the emergency lever may further comprise driving a motor, by the control unit, to switch an electric latch to a state of being operable by the emergency lever.

The method may further comprise, after activating the emergency lever, displaying, by the control unit, a guide for using the emergency lever.

The guide may comprise a phrase.

The emergency lever may be activated when a collision signal of the vehicle is input to the control unit.

The method may further comprise, when the vehicle speed is input to the control unit, determining whether the vehicle is in a stopped state, when it is determined that the vehicle is in the stopped state, opening a door, causing a door unlock signal to be output to the motor by the control unit, and, when the door is opened, releasing a striker installed on a vehicle body of the vehicle, by an electric latch, so that the door is in an operable state by the control unit.

The method may further comprise, when it is determined that the vehicle is not is the stopped state, maintaining, by the electric latch, a state of the striker in which the striker is restrained.

The method may further comprise, when it is determined that there is no error in the state where the vehicle has been started, determining whether the vehicle has been turned off, when it is determined that the vehicle has been turned off, opening a door, causing a door unlock signal to be output to the motor by the control unit, and, when the door is opened, releasing a striker installed on a vehicle body of the vehicle, by an electric latch, so that the door is in an operable state by the control unit.

The method may further comprise, when it is determined that the vehicle has not been turned off, determining whether the vehicle has been stopped, and, when it is determined that the vehicle has been stopped, opening the door.

The method may further comprise, when it is determined that the vehicle has not been stopped, maintaining, by the electric latch, a state of the striker in which the striker is restrained.

According to the method of controlling the electric latch for the door of the vehicle according to the present disclosure having the above configuration, the passenger may manually unlock the door in the situation where the communication for controlling the vehicle within the vehicle is not available in the vehicle to which the electric latch for electrically performing the lock/unlock of the door is applied.

It may be possible to unlock and open the door to which the electric latch is applied even in the emergency situation where the electric latch is not normally operated due to abnormality in the in-vehicle communication or the electric latch.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Hereinafter, a method of controlling an electric latch for a door of a vehicle according to the present disclosure will be described in detail with reference to the accompanying drawings. In the drawings, the same reference numerals will be used throughout to designate the same or equivalent elements. In addition, a detailed description of well-known features or functions will be ruled out in order not to unnecessarily obscure the gist of the present disclosure.

Figure 1:
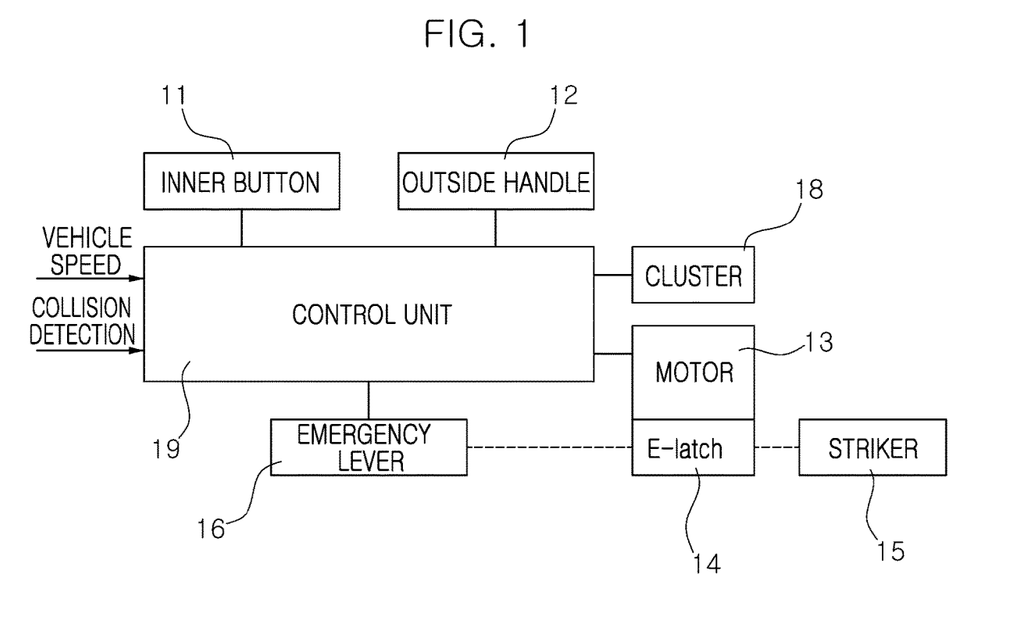
FIG. 1 is a block diagram showing a system in which a method of controlling an electric latch for a door of a vehicle according to the present disclosure is performed.

FIG. 1 shows a system in which a method of controlling an electric latch for a door of a vehicle according to the present disclosure may be performed.

An inner button 11 may be installed inside the vehicle. The inner button 11 may be installed on an inner side of the door, and may be operated by a passenger when the passenger wants to open the door, enabling the passenger to open the door.

An outside handle 12 may be installed on an outer surface of the door. The passenger may open the door by operating the outside handle 12 for getting on the vehicle. As the outside handle 12, an auto flush door handle, which may be hidden in a door panel for forming a same surface to the door panel while parking or traveling and may be automatically unlocked and protrudes when a driver approaches or touches the vehicle with a smart key, may be applied.

An electric latch 14 may be installed inside the door to restrain a striker 15 installed on a vehicle body of the vehicle while parking or traveling so that the door is in a locked state, and releases the restraint of the striker 15 upon getting on or off the vehicle so that the door is unlocked.

A motor 13 may be driven in a state where the electric latch 14 is normal to operate the electric latch 14.

The emergency lever 16 may be provided on one side inside the door. The emergency lever 16 may be connected to the electric latch 14 by a cable so that the electric latch 14 releases the restraint of the striker 15 when the emergency lever 16 is operated.

When the electric latch 14 fails to release the restraint of the striker 15 due to battery discharge or a failure of the motor 13, the passenger may pull the emergency lever 16 to operate the electric latch 14 so that the restraint of the striker 15 is released.

A cluster 18 may be used to inform the passenger of an abnormality of the electric latch 14 or may express a phrase for inducing the use of the emergency lever 16.

A control unit 19 may be configured to perform a method of controlling the electric latch for the door for the vehicle according to the present disclosure, the method to be described later as a logic, and may be configured to control the electric latch to be opened when a vehicle speed of the vehicle is not input.

Figure 2:
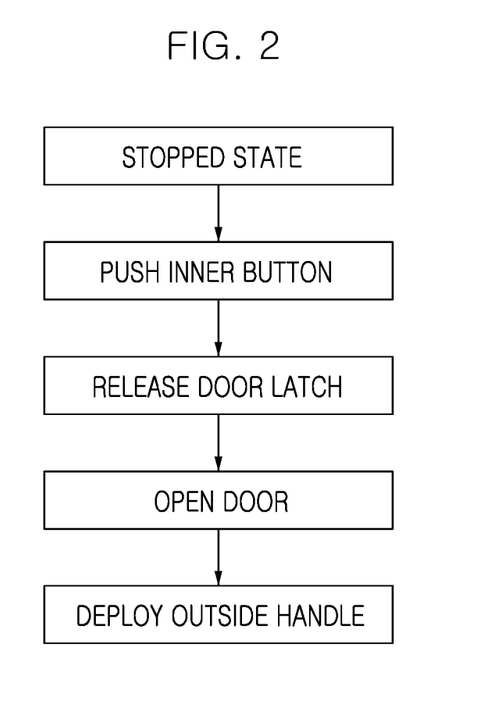
FIG. 2 is a block diagram showing an open process of the door to which a normal electric latch is applied.
Figure 3:
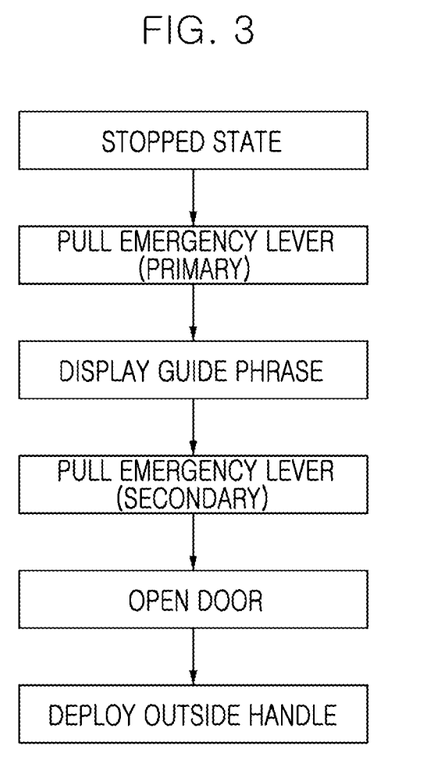
FIG. 3 is a block diagram showing an open process of a door to which an electric latch using an emergency lever is applied.
Figure 4:
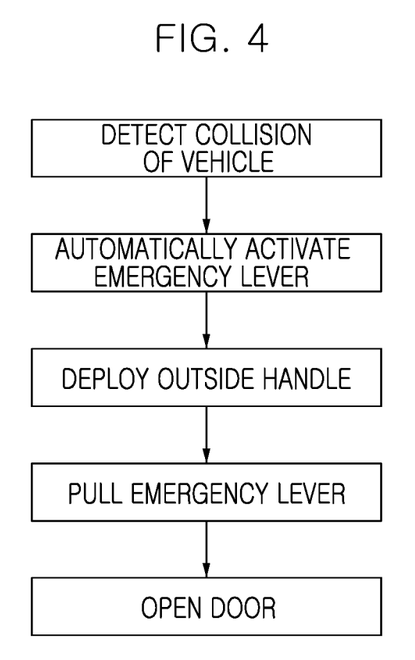
FIG. 4 is a block diagram showing an open process of the door to which the electric latch is applied when a vehicle collides.

FIGS. 2 to 4 show operation processes of the electric latch according to the present disclosure. The control unit 19 may be controlled by the method of controlling the electric latch to be operated, as shown in FIGS. 2 to 4.

First, FIG. 2 shows an operation process when the passenger gets off the vehicle. In a state where the vehicle has been stopped, when the passenger operates the inner button 11 to get off the vehicle, the electric latch 14 may be configured to release the striker 15 to open the door, and the outside handle 12 may also deployed.

In FIG. 3, when the door fails to open due to battery discharge or a failure of the motor 13, a guide phrase indicating that the door may be opened by the emergency lever 16 may be displayed on the cluster 18 when the passenger pulls the emergency lever 16 inside the vehicle in a state where the stop of the vehicle is confirmed. Thereafter, when the emergency lever 16 is pulled again, the door may be in an openable state, so that the door may be opened, and the outside handle 12 may also be deployed.

Meanwhile, FIG. 4 shows an operation process upon collision. When the vehicle collides, the control unit 19 may be configured to operate the electric latch 14 to activate the emergency lever 16 and deploy the outside handle 12 when a vehicle collision signal is input to the control unit 19. When the emergency lever 16 is activated, the passenger may pull the emergency lever 16 in order to escape from the vehicle or operate the outside handle 12 in order to rescue the passenger from the outside, so that the door is opened.

Figure 5:
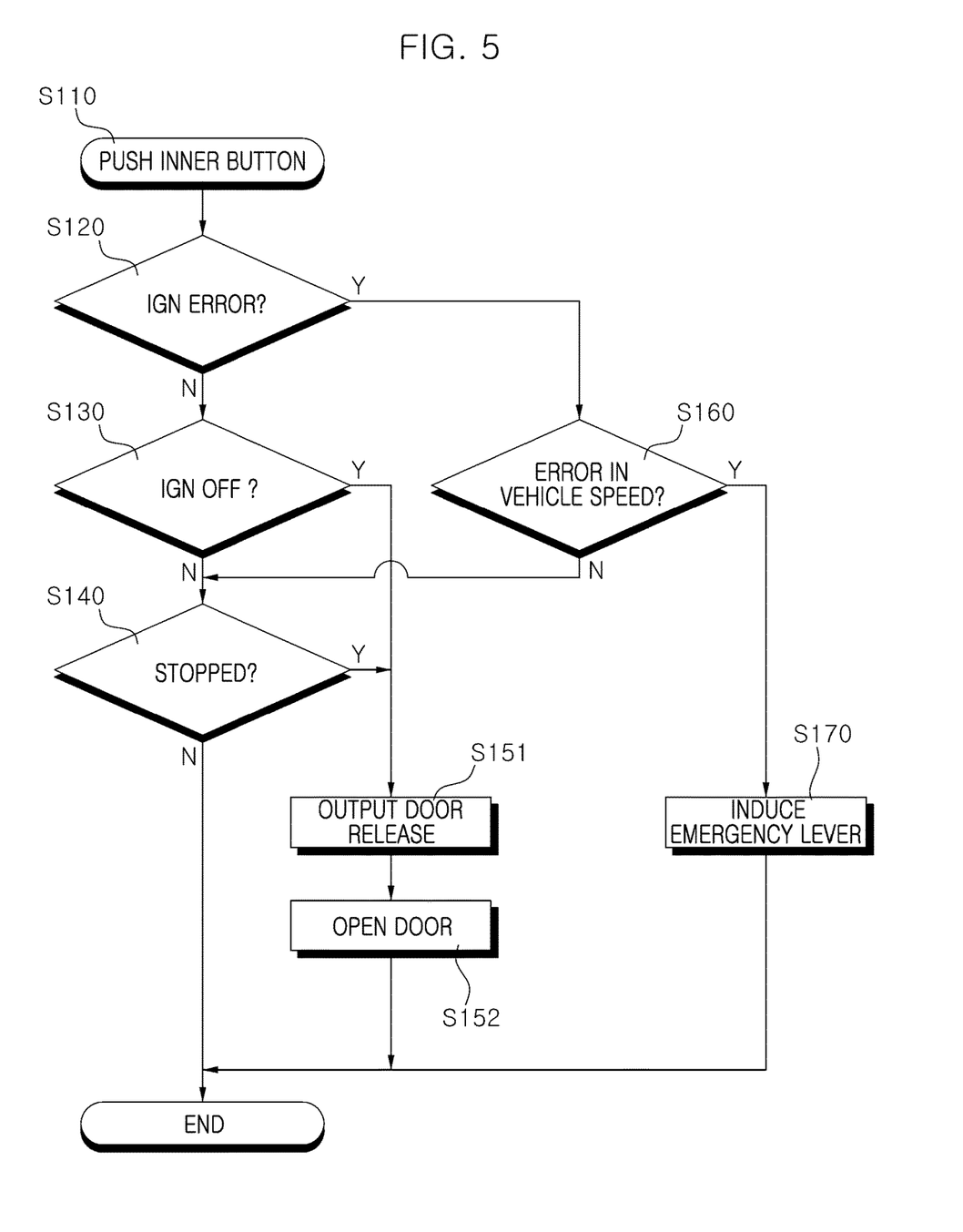
FIG. 5 is a flowchart showing the method of controlling the electric latch for the door of the vehicle according to an exemplary embodiment of the present disclosure.

FIG. 5 shows the method of controlling the electric latch according to an exemplary embodiment of the present disclosure. This exemplary embodiment is a logic operated when the passenger gets out of the interior of the vehicle.

An inner button operating step (S110) is a step of operating the inner button 11 by the passenger in order to get off the vehicle. When the passenger operates the inner button 11 in order to get off the vehicle, a signal output from the inner button 11 may be input to the control unit 19, and the logic may start therefrom.

A starting error determining step (S120) may determine whether there is an error in the starting state of the vehicle. In the present disclosure, 'starting' refers to a state where the vehicle may travel or is traveling, for example, a state where an engine is being operated in an internal combustion engine vehicle, refers to a state where the vehicle may travel by a driving motor or is traveling by the driving motor, or a state where the engine is being operated in a hybrid vehicle, and refers to a state where the vehicle may travel by the driving motor or is traveling by the driving motor in an electric vehicle.

The starting error determining step (S120) may determine whether there is an error in the starting state of the vehicle and may determine whether various devices in the vehicle may be normally operated.

When there is the error in the starting state of the vehicle in the starting error determining step (S120), a vehicle speed input determining step (S160) of determining whether the vehicle speed of the vehicle is normally being input to the control unit 19 may be performed. The starting error determining step (S120) and the vehicle speed input determining step (S160) may be performed to determine whether the door may not be opened. In addition, the starting error determining step (S120) and the vehicle speed input determining step (S160) may be performed to check whether the corresponding signal is not input because there is an error in the in-vehicle control communication such as a controller area network (CAN) communication, or the corresponding signal is not input due to a hardware error. When it is determined that the door may not be opened or when there is the communication error or the hardware error through the starting error determining step (S120) and the vehicle speed input determining step (S160), the passenger may be induced to open the door to get off the vehicle using another method while prohibiting the electric latch 14 from being released by the inner button.

If there is no error in the input vehicle speed in the vehicle speed input determining step (S160), a stop determining step (S140) to be described later may be performed.

Figure 6:
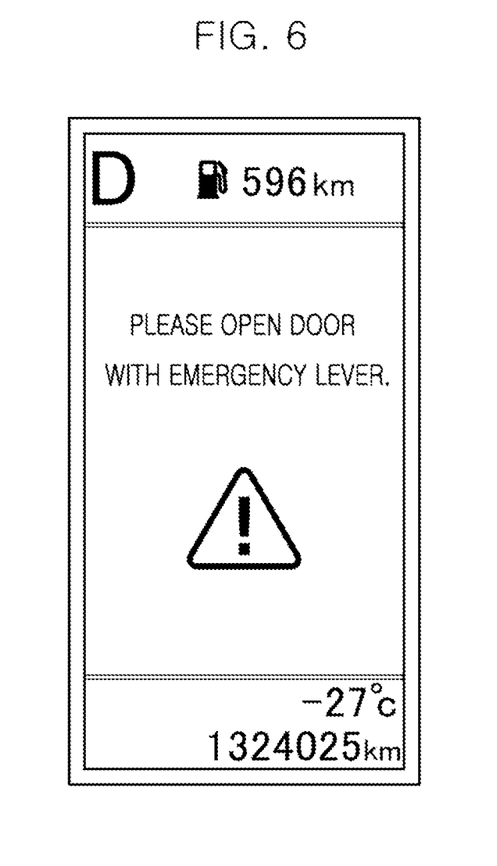
FIG. 6 is a schematic diagram showing a state where a guide phrase inducing the use of an emergency lever is displayed on a cluster in the method of controlling the electric latch for the door of the vehicle according to the present disclosure.

The emergency lever inducing step (S170) may be performed when the vehicle speed is not normally input in the vehicle speed input determining step (S160). An emergency lever inducing step (S170) may guide the use of the emergency lever 16. For example, the control unit 19 may allow a guide phrase indicating that the door needs to be opened using the emergency lever 16 to be displayed on the cluster 18. In addition, the guide phrase may be output as a voice or may also be output as an alarm sound through a speaker.

An ignition-off determining step (S130) may be performed when there is no error in the starting state of the vehicle in the starting error determining step (S120). In the ignition-off determining step (S130), the control unit 19 may be configured to determine whether the vehicle is turned off. When the vehicle is turned off, it means that the vehicle does not travel until it is started again, and when the vehicle is not turned off, it means that the vehicle may travel at any time. Accordingly, the door may be opened in a state where the vehicle is turned off, but in a state where the vehicle is not turned off, the door should be opened according to other conditions.

When it is determined that the vehicle is not turned off in the ignition-off determining step (S130), the stop determining step (S140) of determining whether the vehicle is being stopped may be performed. The stop determining step (S140) may determine whether the vehicle has been stopped, and determine whether the vehicle has been stopped by the vehicle speed input to the control unit 19. When the vehicle speed of the vehicle is 0 KPH, the door may be opened because the vehicle has been stopped.

When it is determined that the vehicle is not being stopped in the stop determination step S140, the logic may be terminated so that the electric latch 14 maintains the state of restraining the striker 15.

Meanwhile, when it is determined that the vehicle is being stopped in the stop determining step (S140), the intention of the passenger to get off the vehicle has been already reflected through the inner button operating step (S110), so that a door opening requiring step (S151) and a door opening step (S152) are performed so that the passenger may get off the vehicle.

In the door opening requiring step (S151), the control unit 19 may be configured to output a door unlock signal to the motor 13 so that the locked door becomes the unlocked state.

In the door opening step (S152), the control unit 19 may be configured to drive the motor 13 so that the electric latch 14 is operated. When the motor 13 operates the electric latch 14, the electric latch 14 may be configured to release the restraint of the striker 15, so that the electric latch 14 is unlocked and the door is in the openable state. As described above, when the door is in the openable state, the passenger may directly open the door. Alternatively, when the door is electrically opened and closed, the control unit 19 may be configured to allow the door to be electrically opened.

Figure 7:
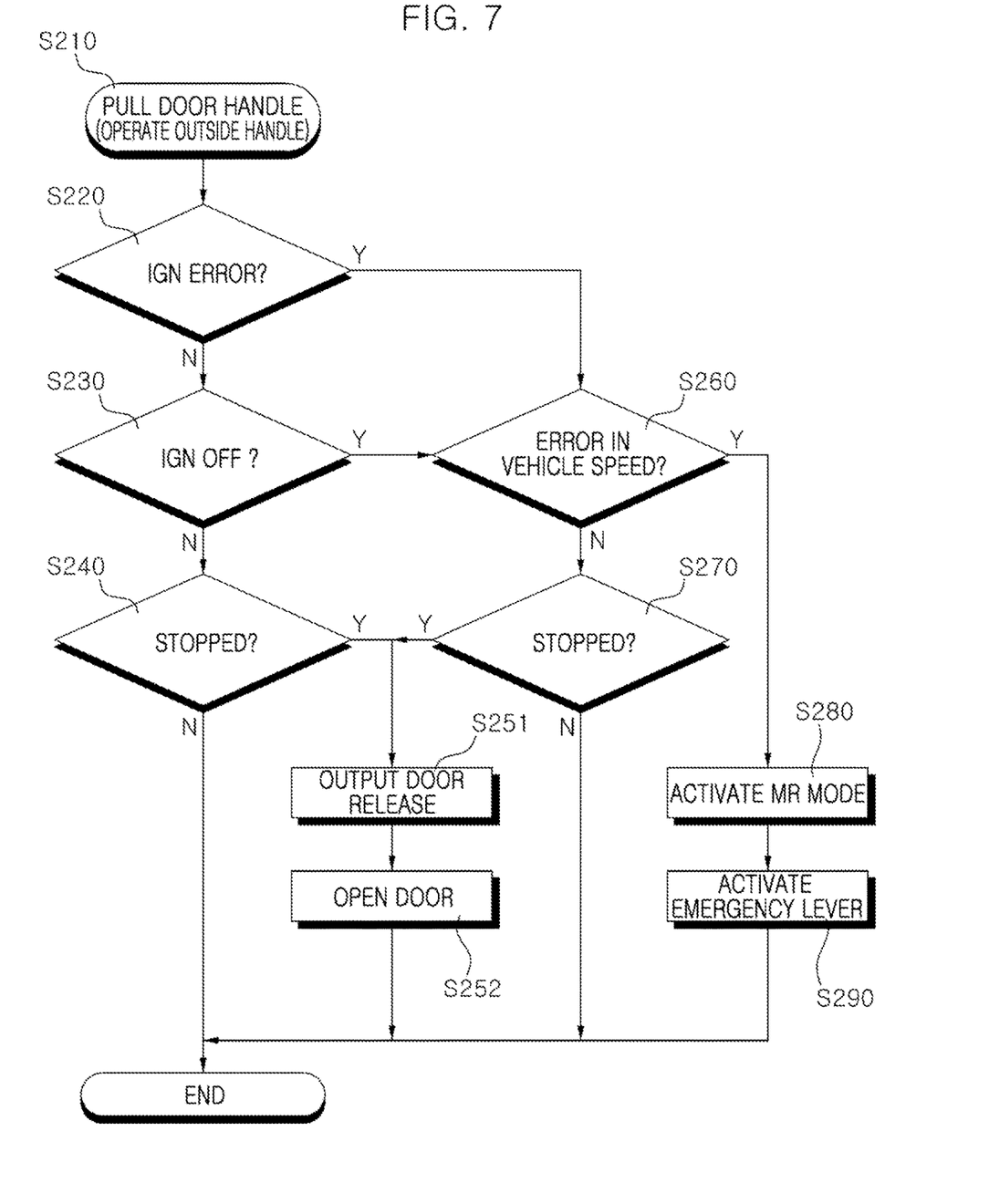
FIG. 7 is a flowchart showing a method of controlling the electric latch for a door of a vehicle according to another exemplary embodiment of the present disclosure.

FIG. 7 shows a method of controlling an electric latch for a door of a vehicle according to another exemplary embodiment of the present disclosure.

The method of controlling the electric latch for the door for the vehicle according to the present exemplary embodiment may be performed when there is an operation by the outside handle unlike the aforementioned exemplary embodiment.

In an outside handle operating step (S210), the passenger may operate the outside handle 12 installed on the outer surface of the door in order to enter the interior of the vehicle.

The outside handle operating step (S210) may be always performed when the outside handle 12 is operated in a state to be exposed to the outer surface of the door. Alternatively, the outside handle operating step (S210) may also include a case where the auto flush door handle type outside handle 12 is operated in a state where the passenger approaches the door with the smart key or unlocks the door with the smart key to deploy the outside handle.

Thereafter, a starting error determining step (S220) may be performed, and a vehicle speed input determining step (S260) may be performed when there is an error in a state where the vehicle has been started in the starting error determining step (S220), and these may be the same as the starting error determining step (S120) and the vehicle speed input determining step (S130) in the aforementioned exemplary embodiment. Accordingly, the starting error determining step (S220) and the vehicle speed input determining step (S260) may be performed to determine whether there is a situation where the door may not be opened, or the starting error determining step (S220) and the vehicle speed input determining step (S260) may be performed to check whether the corresponding signal is not input due to an error of the in-vehicle control communication such as CAN communication, or whether the corresponding signal is not input due to a hardware error.

An emergency lever activating step (S280) may be performed when there is an error in the vehicle speed in the vehicle speed input determining step (S260). The emergency lever 16 may be connected to the electric latch 14 through a cable to manually operate the electric latch 14 in an emergency. When there is the error in the vehicle speed, the control unit 19 may be configured to drive the motor 13 to switch the electric latch 14 to a mechanical redundancy (MR) mode operable by the cable, that is, a state where the emergency lever has been activated.

Meanwhile, even when a collision detection signal of the vehicle is input to the control unit 19 before the emergency lever activating step (S280), the emergency lever activating step (S280) may be performed. Even when the vehicle collides, the electric latch 14 may be normally operated and thus the restraint of the striker 15 may not be released. Accordingly, when the collision of the vehicle is detected, the emergency lever 16 may be activated.

Figure 8:
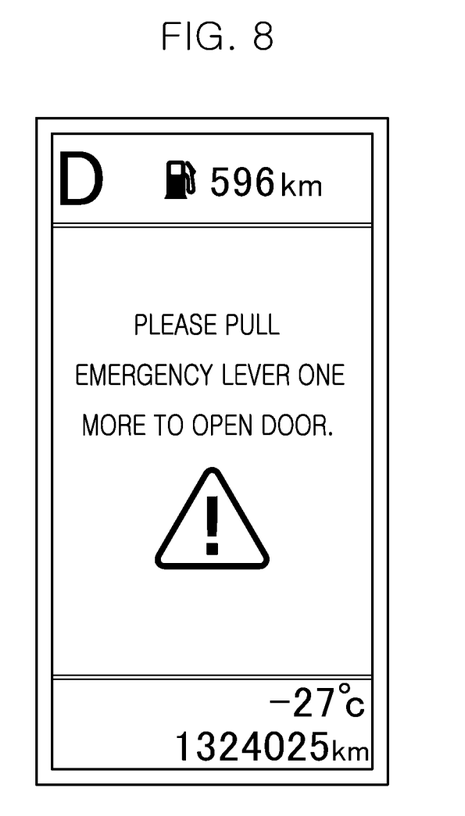
FIG. 8 is a schematic diagram showing a state where a guide phrase in which the emergency latch has been activated is displayed on the cluster in the method of controlling the electric latch for the door of the vehicle according to the present disclosure.

As described above, when the electric latch 14 is released by the emergency lever 16, an emergency lever activation guiding step (S290) may be performed to inform that the MR mode has been activated. In the emergency lever activation guiding step (S290), the control unit 19 may be configured to control a guide phrase guiding the use of the emergency lever 16 on the cluster 18 to be output (see FIG. 8). In addition to the cluster 18, the guide phrase may be output by voice, or the activation of the MR mode may be guided by an alarm sound.

Through the emergency lever activating step (S280), it has been informed that the door may be opened by releasing the electric latch 14 with the emergency lever 16, so that when the electric latch 14 may not be released normally, the electric latch 14 may be released mechanically so that the door is opened.

When there is no error in the starting state of the vehicle in the starting error determining step (S220), the ignition-off determining step (S230) may be performed, so that the control unit 19 may determine whether the vehicle is turned off.

When it is determined that the vehicle is not turned off in the ignition-off determining step (S230), the stop determining step (S240) of determining whether the vehicle is being stopped may be performed. In addition, the stop determining step (S240) may be performed even when there is no error in the vehicle speed input to the control unit 19 in the vehicle speed input determining step (S260).

The stop determining step (S240) may determine whether the vehicle has been stopped by the vehicle speed input to the control unit 19. When the vehicle speed of the vehicle is 0 KPH, the door may be opened because the vehicle has been stopped.

When it is determined that the vehicle is not being stopped in the stop determination step S240, the logic may be terminated so that the electric latch 14 maintains the state of restraining the striker 15.

Meanwhile, when it is determined that the vehicle is being stopped in the stop determining step (S240), a door opening requiring step (S251) and a door opening step (S252) may be performed so that the door may be opened.

In the door opening requiring step (S251), the control unit 19 may be configured to output a door unlock signal to the motor 13.

In the door opening step (S252), the control unit 19 may be configured to drive the motor 13 to operate the electric latch 14 to release the restraint of the striker 15. As described above, when the electric latch 14 is in an unlocked state and the door is in an operable state, the door may be opened by the passenger or the door is electrically opened by the control of the control unit 19.

While the present disclosure has been shown and described in relation to specific embodiments thereof, it would be obvious to those of ordinary skill in the art that the present disclosure can be variously improved and changed without departing from the spirit of the present disclosure provided by the following claims.

What is claimed is:

1. A method of controlling an electric latch installed on a door of a vehicle to lock or unlock the door by being operated by a motor, the method comprising:
   (a) operating an inner button to enable a passenger to exit the vehicle;
   (b) determining whether there is an error in a state where the vehicle has been started;
   (c) determining whether a vehicle speed is input to a control unit;
   (d) when the vehicle speed is not input, inducing an emergency lever to guide a use of the emergency lever connected to the electric latch by a cable; and
   (e) when the emergency lever is pulled, releasing the electric latch by the cable,
   wherein the error determination in step (b) and the absence of vehicle speed input in step (d) are caused by an error in in-vehicle controller area network (CAN) communication; and
   wherein, in step (d), the control unit induces the passenger to use the emergency lever while prohibiting the electric latch from being released by the inner button, and
   wherein the inducing of the emergency lever further comprises controlling, using the control unit, display of a phrase on a cluster guiding the use of the emergency lever and output, as a voice or an alarm sound, through a speaker guiding the use of the emergency lever.

2. The method of claim 1, further comprising:
   when the vehicle speed is input to the control unit, determining whether the vehicle is in a stopped state;
   when it is determined that the vehicle is in the stopped state, outputting a door unlock signal to a motor by the control unit; and
   operating, by the motor in response to receipt of the door unlock signal, the electric latch to release a striker installed on a vehicle body of the vehicle, and place the door in an openable state.

3. The method of claim 2, further comprising, when it is determined that the vehicle is not in the stopped state, maintaining, by the electric latch, a state of the striker in which the striker is restrained.

4. The method of claim 1, further comprising:
   when it is determined that there is no error in the state where the vehicle has been started, determining whether the vehicle has been turned off;
   when it is determined that the vehicle has been turned off, outputting a door unlock signal to a motor by the control unit; and
   operating, by the motor in response to receipt of the door unlock signal, the electric latch to release a striker installed on a vehicle body of the vehicle and place the door in an openable state.

5. The method of claim 4, further comprising:
   when it is determined that the vehicle has not been turned off, determining whether the vehicle has been stopped; and
   when it is determined that the vehicle has been stopped, opening the door.

6. The method of claim 5, further comprising, when it is determined that the vehicle has not been stopped, maintaining, by the electric latch, a state of the striker in which the striker is restrained.

7. A method of controlling an electric latch installed on a door of a vehicle to lock or unlock the door by being operated by a motor, the method comprising:
   (a) operating an outside handle, installed on a door of the vehicle, to enable entry into the vehicle;
   (b) determining whether there is an error in a state where the vehicle has been started;
   (c) determining whether a vehicle speed is input to a control unit;
   (d) when the vehicle speed is not input, activating, by the control unit, an emergency lever connected to the electric latch by a cable; and
   (e) when the emergency lever is pulled, releasing the electric latch by the cable,
   wherein the error determination in step (b) and the absence of vehicle speed input in step (d) are caused by an error in in-vehicle controller area network (CAN) communication; and
   wherein, in step (d), the control unit induces a passenger to use the emergency lever and
   wherein, after activating the emergency lever, displaying through a cluster and output through a speaker, by the control unit, a guide for using the emergency lever.

8. The method of claim 7, wherein activating the emergency lever further comprises driving a motor, by the control unit, to switch an electric latch to a state of being operable by the emergency lever.

9. The method of claim 7, wherein the guide comprises a phrase.

10. The method of claim 7, wherein the emergency lever is activated when a collision signal of the vehicle is input to the control unit.

11. The method of claim 7, further comprising:
when the vehicle speed is input to the control unit, determining whether the vehicle is in a stopped state;
when it is determined that the vehicle is in the stopped state, outputting a door unlock signal to the motor by the control unit; and
operating, by the motor in response to receipt of the door unlock signal, the electric latch to release a striker installed on a vehicle body of the vehicle place the door in an openable state.

12. The method of claim 11, further comprising, when it is determined that the vehicle is not in the stopped state, maintaining, by the electric latch, a state of the striker in which the striker is restrained.

13. The method of claim 7, further comprising:
when it is determined that there is no error in the state where the vehicle has been started, determining whether the vehicle has been turned off;
when it is determined that the vehicle has been turned off, outputting a door unlock signal to the motor by the control unit; and
operating, by the motor in response to receipt of the door unlock signal, the electric latch to release a striker installed on a vehicle body of the vehicle and place the door in an openable state.

14. The method of claim 13, further comprising:
when it is determined that the vehicle has not been turned off, determining whether the vehicle has been stopped; and
when it is determined that the vehicle has been stopped, opening the door.

15. The method of claim 14, further comprising, when it is determined that the vehicle has not been stopped, maintaining, by the electric latch, a state of the striker in which the striker is restrained.

* * * * *